United States Patent [19]
Reardon

[11] 3,888,926
[45] June 10, 1975

[54] METHOD OF PREPARING INDOPHENOLS AND OXICHROMIC COMPOUNDS

[75] Inventor: Daniel Francis Reardon, Rochester, N.Y.

[73] Assignee: Eastman Kodak Company, Rochester, N.Y.

[22] Filed: Aug. 30, 1973

[21] Appl. No.: 393,242

Related U.S. Application Data

[63] Continuation-in-part of Ser. No. 206,927, Dec. 10, 1971, abandoned.

[52] U.S. Cl.... 260/559 A; 260/332.2 A; 360/505 R; 260/556 A; 260/556 AR; 260/558 A; 260/559 B; 260/465 E
[51] Int. Cl............................................ C07c 91/44
[58] Field of Search ......... 260/562, 465, 558, 332.2

[56] References Cited
OTHER PUBLICATIONS
Matthies, Anchiv. der Pharm., Vol. 301, p. 867–872, (1968).

*Primary Examiner*—Harry I. Moatz
*Attorney, Agent, or Firm*—G. E. Battist

[57] ABSTRACT

Methods of preparing compounds are disclosed which comprise reacting an α-brominated ketomethylene color coupler with an unoxidized aminophenol. In one aspect, oxichromic compounds are prepared by this method which upon chromogenic oxidation form an indophenol dye.

8 Claims, No Drawings

METHOD OF PREPARING INDOPHENOLS AND OXICHROMIC COMPOUNDS

This application is a continuation-in-part of my application U.S. Ser. No. 206,927 filed Dec. 10, 1971 now abandoned.

This invention relates to methods of preparing indo dyes and compounds which are oxichromic compounds that undergo chromogenic oxidation to form indo dyes, i.e., imine dyes, such as indophenols. In another aspect, this invention relates to the process of reacting an α-brominated ketomethylene coupler with an unoxidized aromatic amine.

It is known in the art to react oxidized color developing agents with color couplers to form indophenols, indoanilines and the like, for example, as disclosed in Fischer, U.S. Pat. No. 1,102,028; Schinzel, U.S. Pat. No. 2,249,541; Mees and James, *The Theory of the Photographic Process*, Third Edition, Chapter 17, 1966; and the like. It is also known that the rates of coupling with oxidized color developers can change with the substituents on the active methylene coupler as disclosed in the last reference above. However, the indophenols, indoanilines, etc., formed in the prior art were often accompanied by a large number of by-products due to the high reactivity of the oxidized color developer, and, even after isolating the desired indo dye, it had to be reduced if a leuco form of the compound was desired. In view of the interest in oxichromic compounds which can undergo chromogenic oxidation to produce a photographic dye as disclosed, for example, in Lestina and Bush, U.S. Ser. No. 308,869, entitled "Photographic Elements Containing Oxichromic Compounds" filed Nov. 22, 1972, improved processes for making these compounds are desired.

I have now discovered that certain compounds can be made in good yields with high purity by reacting α-brominated ketomethylene color couplers with an aromatic primary amine, preferably under selected conditions. In one aspect, the oxichromic compound is produced directly by this reaction and does not require further reduction to obtain compounds which have been identified in some literature references as leuco indophenols. Moreover, the aminophenol does not have to be oxidized prior to reaction with the coupler, which in turn provides the possibility of the aminophenol's reacting with itself, etc. Generally, the reaction is a very clean, expeditious reaction with high yields of desired product compared with reactions of this type known in the art where lower yields are obtained and/or higher yields of undesirable by-products are obtained.

In one preferred embodiment, the reaction is carried out in polar solvent systems with an acid acceptor (i.e., a weak base), and in highly preferred embodiments the acid acceptor is dimethylaniline and the polar organic solvent is dimethylformamide.

In another preferred embodiment, the reaction is carried out in a liquid medium in an inert or oxygen-free atmosphere such as nitrogen, etc.

Generally, the process of this invention relates to the reaction of an α-brominated, open-chain ketomethylene color coupler with an aromatic primary amine at the coupling position of the coupler, preferably in substantially equimolar amounts. Open-chain ketomethylene couplers are well-known in the art as those open-chain compounds which couple at the carbon atom forming the methylene moiety (e.g.:

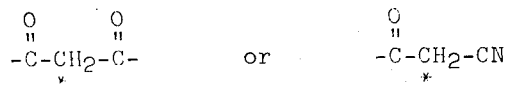

* denoting the coupling position). Typical useful open-chain ketomethylene couplers are the α-benzoylacetanilides such as α-benzoyl-2-nitroacetanilide, α-benzoyl-4-(p-toluenesulfonamido)-acetanilide, α-(2-methoxybenzoyl)-4-toluenesulfonamido-2-chloroacetanilide, α-[3-{α-(2,4-di-tert-amylphenoxy)acetamido}benzoyl]-2-methoxyacetanilide, 4-benzoylacetamido-3-methoxy-(2,4-di-tert-amylphenoxy)acetanilide, and the like, and the α-pivalylacetanilides such as α-pivalyl-2-chloro-5-nitroacetanilide, α-pivalyl-5-(3-aminobenzamido)-2-chloroacetanilide, α-pivalyl-4-(N-methyl-N-n-octadecylsulfamyl)acetanilide, α-pivalyl-4-sulfoacetanilide, potassium salt, α-pivalylacetanilide, and the like. Additional useful open-chain ketomethylene compounds are disclosed in "Azomethine Dyes. II. Color and Constitution of Acylacetamide Axomethine Dyes," *Journal of the American Chemical Society*, 79, 2,919–2,927 (1957); "Farbkuppler-Eine Literaturuebersicht", *Agfa Mitteilungen*, Band II, pp. 112–126; U.S. Pat. Nos. 2,875,057 by McCrossen et al issued Feb. 24, 1959; 2,407,210 by Weissberger et al issued Sept. 3, 1946; 3,265,506 by Weissberger et al issued Aug. 9, 1966; 2,298,443 by Weissberger issued Oct. 13, 1942; 2,115,394 by Mannes et al issued Apr. 26, 1938; 2,359,274; and 2,376,679; German Pat. No. 1,036,639; British Pat. No. 493,952; etc.

The open-chain ketomethylene couplers can be brominated by any brominating agent known in the art for this purpose. In one embodiment, the open-chain ketomethylene coupler is brominated when the oxichromic compounds are prepared.

The brominated open-chain ketomethylene color couplers used in this reaction preferably contain the group:

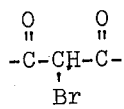

The aromatic primary amine which can be reacted with the α-brominated ketomethylene coupler to produce a compound with a reduced azomethine linkage can generally be any aromatic compound having a primary amino group and is preferably a p-aminophenol. In one preferred embodiment, the aromatic primary amine has the structure $NH_2$-Ar-OH, wherein Ar is an arylene group, such as benzenoid groups and carbocyclic arylene groups, containing from 6 to 20 carbon atoms including substituted arylene groups, unsubstituted arylene groups, fused-ring arylene groups and, preferably, a phenylene group wnich is preferably substituted with halogen atoms or groups containing halogen atoms in the ortho or meta positions of the ring. The substituents on the arylene ring are electropositive or, preferably, electronegative substituents. Typical useful aminophenols are disclosed in Bush, Gates and Newmiller, U.S. Ser. No. 169,706 filed Aug. 6, 1971, now U.S. Pat. No. 3,791,827 which is incorporated herein by reference.

The reaction is generally carried out in a polar solvent in a basic medium and is preferably carried out in the presence of an acid acceptor. The polar solvent is generally any one of the organic polar solvents such as dimethylformamide and the like.

The acid acceptor can be any tertiary amine useful for the purpose and preferably is a dialkyl aniline such as dimethylaniline and the like. In certain instances, the acid acceptor could serve as a polar solvent and the acid acceptor simultaneously, especially when dimethylformamide is used as a polar solvent, since it appears also to function as a weak base.

The reaction is preferably carried out in a liquid medium in an inert or oxygen-free atmosphere, such as nitrogen, when the oxichromic compounds are desired in their unoxidized form. However, if the indophenol dyes are desired as a reaction product, the reaction can be carried out in oxidizing conditions.

Typical oxichromic compounds (sometimes referred to as leuco indophenols) which are prepared by this method are as follows:

I 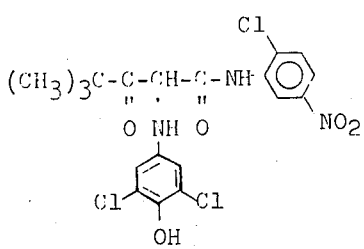

II 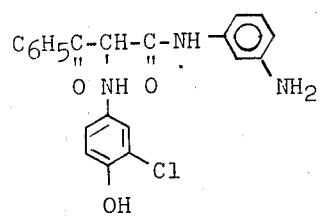

III 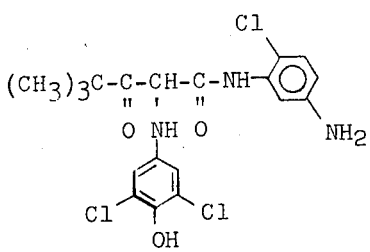

IV 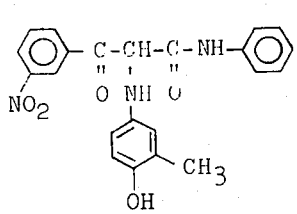

V 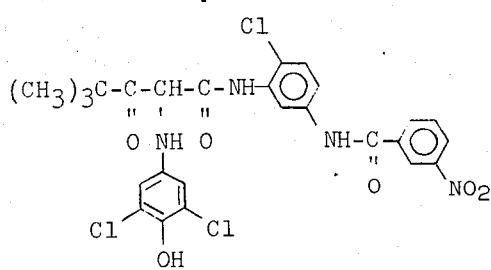

VI 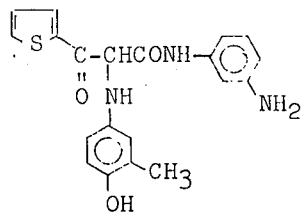

VII 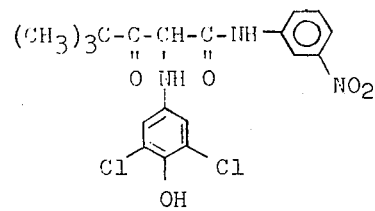

VIII 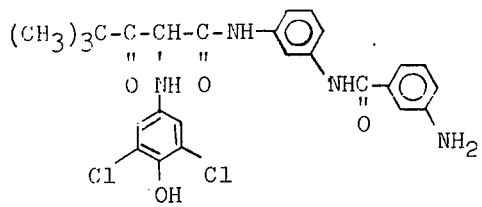

It is understood, of course, that the oxichromic compounds can be readily oxidized to produce the indophenol dyes which are known in the photographic art.

The oxichromic compounds of this invention can also be reacted with a compound containing a developing agent to provide an oxichromic developer as set forth in Lestina and Bush, above, or as set forth in Anderson, U.S. Ser. No. 206,925 entitled "Oxichromic Compounds and Photographic Elements Containing Same," filed Dec. 10, 1971.

The term "oxichromic compound" as used herein is understood to refer to those compounds which undergo chromogenic oxidation wherein they can form a dye.

The term "azomethine linkage" is understood to mean the grouping:

$$(>C=N-)$$

which is more commonly referred to in chemical literature as an "imine" group and is exclusive of hydrogen atom substitution, and the term "reduced azomethine linkage" or "reduced imine linkage" is understood to mean the grouping:

$$(>\overset{|}{C}-\overset{|}{N}-)$$

wherein a single bond is present between said N and all next adjacent atoms, which are preferably covalent bonds. Preferably, the azomethine compounds of this invention are further defined as being indophenols, which is understood to refer to compounds having the general structure:

(COUP)=N—Ar—OH wherein (COUP) is a color coupler such as an open-chain ketomethylene coupler linked to said nitrogen atom through a carbon atom at the coupling position, and Ar is as defined above.

The reactions of the unoxidized aminophenol with the α-brominated open-chain ketomethylene to produce an indophenol having a reduced azomethine linkage can generally be run over a wide variety of temperatures, but are preferably run about room temperature at temperatures from 10°C. to 30°C., and may be run at temperatures from the freezing point of the reaction mixture up to steam bath temperatures or even higher. The reaction is generally run for 8 to 20 hours, but the reaction time can be varied by changing other conditions. Preferably, the reaction is run with substantially equimolar amounts of reactants; however, in some instances, it is desirable to use an excess of the aminophenol of about 10 percent by molar concentration.

The instant reaction is preferably and conveniently effected at atmospheric pressure, although higher pressures or even subatmospheric pressures can be utilized.

The invention can be further illustrated by the following examples of preferred embodiments thereof.

EXAMPLE 1 — PREPARATION OF INTERMEDIATE 1-B

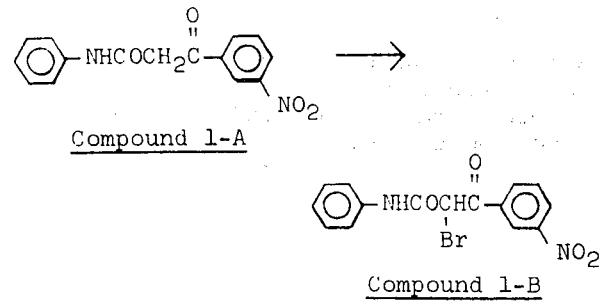

Compound 1-A

Compound 1-B

A suspension of 56.8 g. (0.02 mole) of Compound 1-A in 500 ml. of chloroform is added with stirring to a suspension of 35.4 g. (0.2 mole) of recrystallized N-bromosuccinimide in 500 ml. of chloroform. The mixture is refluxed for 40 minutes, cooled to room temperature, washed with a dilute solution of sodium bisulfite, then washed twice with water, dried and concentrated. The resulting solid is recrystallized from benzene cyclohexane to yield 45 g. (62 percent) of pure solid which is believed to have the structure of Compound 1-B.

| Calculated | | |
|---|---|---|
| for $C_{15}H_{11}BrN_2O_4$: | C, 49.6; H, 3.1; Br, | 22.0; N, 7.7 |
| Found: | C, 49.7; H, 3.2; Br, | 23.0; N, 7.7 |
| | | 22.6 |

Preparation of Compound 1-C

A solution of 74 g. (0.2 mole) of Compound 1-B, 36.5 g. (0.2 mole) of 2,6-dichloro-4-aminophenol and 22 ml. (0.2 mole) N,N-dimethylaniline is stirred at room temperature under a nitrogen atmosphere for 19 hours, then poured onto a mixture of ice and 80 ml. of concentrated hydrochloric acid. After standing for several hours, the water and acid are decanted and the resulting gum is washed with several portions of water and then treated with 200 ml. of methanol and allowed to stand. One hundred ml. of acetonitrile are added, the mixture is slurried, filtered, and the solid washed with methanol — water and dried. There is obtained 64 g. (70 percent) of Compound 1-C. A sample is recrystallized from acetonitrile-water to give a product, melting at 168°–170°C.

| Calculated for | | | | |
|---|---|---|---|---|
| $C_{21}H_{15}Cl_2N_3O_5$: | C, 55.0; | H, 3.3; | N, 9.2; | Cl, 15.5 |
| Found: | C, 54.4; | H, 3.5; | N, 9.2; | Cl, 15.2 |
| | 54.4 | 3.4 | 9.3 | 15.4 |

The Compound 1-C is believed to have the formula:

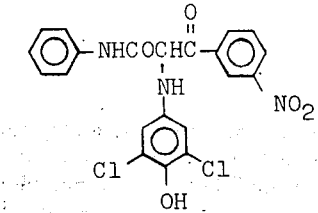

1-D (Control)

The reaction is repeated with the exception that the N,N-dimethylaniline is omitted and a large excess of the 2,6-dichloro-4-aminophenol is present in the reaction. The reaction product contains more undesirable by-products than the reaction under 1-C and a substantially lower yield of Compound 1-C is obtained, i.e., less than half of that obtained in Example 1-C.

EXAMPLE 2

Dissolved in 250 ml. dry dimethylformamide under nitrogen at room temperature are 21.0 g. (0.0556 mol) of α-bromo,α-pivalyl-(2-chloro,5-nitro)acetanilide and 8.50 ml. (0.067 mole) dimethylaniline; 11.93 g. (0.067 mole) of 2,6-dichloro-4-aminophenol are added and stirring in continued for 24 hours. A tan oil separates when the reaction mixture is poured, with stirring, into 1 liter water containing 10 ml. concentrated HCl. The aqueous phase is decanted and the oil triturated with trifluoroacetic anhydride. The oil dissolves and a small amount of yellow solid precipitates. The slurry is added with stirring to 500 ml. methanol. The yellow solid is separated, filtered, washed with methanol and dried in air; 16.6 g. (65.4 percent yield) of crude product is obtained, m.p. 220°–225°C. The crude solid is recrystallized from acetonitrile to give 10.7 g. (42.1% yield) of pure solid.

| Calculated | |
|---|---|
| for $C_{19}H_{18}Cl_3N_3O_5$: | C, 48.07; H, 3.82; Cl, 22.41 |
| Found: | C, 47.7 ; H, 3.7 ; Cl, 22.3 |
| | 22.4 |

The compound is believed to have the formula of Formula I in the specification.

EXAMPLE 3

Example 2 is repeated using glacial acetic acid in place of trifluoroacetic anhydride. Similar results are obtained.

EXAMPLE 4

Compounds II–VIII are prepared by using the respective α-halogenated coupler and reacting it with the respective p-aminophenol according to the procedure of Examples 1 or 2.

Although the invention has been described in considerable detail with particular reference to certain preferred embodiments thereof, variations and modifications can be effected within the spirit and scope of the invention.

I claim:

1. A process comprising reacting 1) an open-chain ketomethylene photographic coupler compound comprising the group:

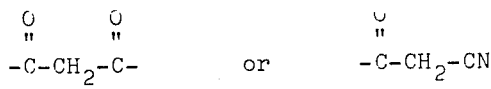

which is α-brominated on the methylene carbon atom shown in said formulae with 2) an aromatic primary amine which is a 2,6-dihalo-4-aminophenol, said reaction being carried out a) in a basic medium containing a tertiary amine acid acceptor which is a weak base and b) in the presence of a polar solvent.

2. A process according to claim 1 wherein said polar solvent is dimethylformamide.

3. A process according to claim 1 wherein said acid acceptor is dimethylaniline.

4. A process according to claim 1 wherein said process is carried out in a liquid medium in an inert atmosphere.

5. A process according to claim 1 wherein said reaction conditions are maintained at a temperature range between 10°C. and 30°C.

6. A process according to claim 1 wherein said indophenol compound has the formula:

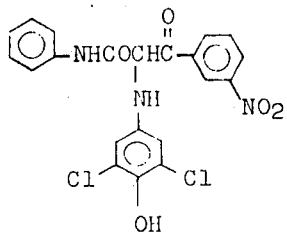

7. A process according to claim 1 wherein said indophenol compound has the formula:

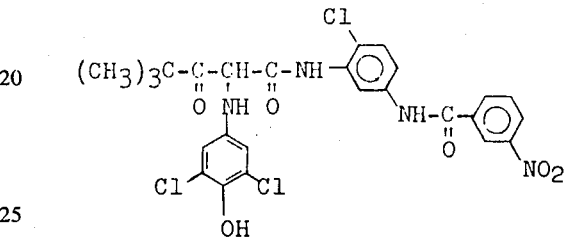

8. A process comprising reacting an open-chain ketomethylene photographic coupler compound comprising the group:

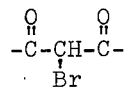

with an aromatic primary amine which is a 2,6-dichloro-4-aminophenol, wherein the reaction is carried out in a basic medium containing dimethylaniline and dimethylformamide.

* * * * *